(12) United States Patent
Refaeli et al.

(10) Patent No.: US 8,149,106 B2
(45) Date of Patent: Apr. 3, 2012

(54) APPARATUS AND METHOD FOR DATA COMMUNICATION OVER POWER LINES

(75) Inventors: Rami Refaeli, Kfar-Saba (IL); Barzily Mizrachi, Givat Shmuel (IL)

(73) Assignee: Main.Net Communications Ltd., RaAnana (IL)

( * ) Notice: Subject to any disclaimer, the term of this patent is extended or adjusted under 35 U.S.C. 154(b) by 357 days.

(21) Appl. No.: 12/513,865

(22) PCT Filed: Nov. 8, 2007

(86) PCT No.: PCT/IL2007/001380
§ 371 (c)(1),
(2), (4) Date: May 7, 2009

(87) PCT Pub. No.: WO2008/056367
PCT Pub. Date: May 15, 2008

(65) Prior Publication Data
US 2010/0039242 A1      Feb. 18, 2010

Related U.S. Application Data

(60) Provisional application No. 60/864,984, filed on Nov. 9, 2006.

(51) Int. Cl.
*G08B 1/08*       (2006.01)
*H04M 11/04*    (2006.01)
*H04Q 1/30*      (2006.01)

(52) U.S. Cl. ...................... 340/538; 340/12.32; 375/258

(58) Field of Classification Search .................. 340/538, 340/531, 538.11, 310.17, 12.32, 12.33, 12.38; 375/258; 379/90.01, 102.4, 413
See application file for complete search history.

(56) References Cited

U.S. PATENT DOCUMENTS

| | | | |
|---|---|---|---|
| 5,675,575 A * | 10/1997 | Wall et al. | 370/326 |
| 7,003,102 B2 * | 2/2006 | Kiko | 379/413 |
| 7,321,291 B2 * | 1/2008 | Gidge et al. | 375/258 |
| 7,382,232 B2 * | 6/2008 | Gidge et al. | 340/12.32 |
| 7,450,000 B2 * | 11/2008 | Gidge et al. | 340/538 |
| 2003/0071719 A1 | 4/2003 | Crenshaw et al. | |
| 2005/0046550 A1 | 3/2005 | Crenshaw et al. | |
| 2006/0192672 A1 | 8/2006 | Gidge et al. | |

FOREIGN PATENT DOCUMENTS

WO      WO 2008/056367       5/2008

OTHER PUBLICATIONS

International Preliminary Report on Patentability Dated Aug. 13, 2009 From the International Bureau of WIPO Re.: Application No. PCT/IL2007/001380.
International Search Report Dated Jan. 16, 2009 From the International Searching Authority Re.: Application No. PCT/IL07/01380.
Written Opinion Dated Jan. 16, 2009 From the International Searching Authority Re.: Application No. PCT/IL07/01380.

* cited by examiner

*Primary Examiner* — John A Tweel, Jr.

(57) ABSTRACT

A method and apparatus for transferring communication data over power lines, the power lines comprising multiple phase transmission lines and a neutral line. The method includes inserting the communication data between multiple lines, typically between the different phase lines and the neutral, and combining the communication data from any one of the lines, and transmitting the combined signal to multiple lines in a receiving premises. In this way the signal can be picked up from any power socket at the receiving premises irrespective of what line or phase it may be attached to.

17 Claims, 5 Drawing Sheets

APPARATUS AND METHOD FOR DATA COMMUNICATION OVER POWER LINES

RELATED APPLICATIONS

This application is a National Phase Application of PCT Patent Application No. PCT/IL2007/001380 having International Filing Date of Nov. 8, 2007, which claims benefit under 35 U.S.C. §119(e) from U.S. Provisional Patent Application No. 60/864,984, filed Nov. 9, 2006. The contents of the above Application are all incorporated herein by reference.

FIELD AND BACKGROUND OF THE INVENTION

The present invention, in some embodiments thereof, relates to apparatus and a method for data transmission over power lines and, more particularly, but not exclusively, to such data transmission wherein the power lines are multi-phase.

The history of communication over power lines begins with narrowband power line communications and this appeared soon after the beginning of wide-spread electrical power supply. Around the year 1922 the first carrier frequency systems began to operate over high-tension lines in the frequency range 15 to 500 kHz for telemetry purposes, and this continues to the present time.

In the 1930s, ripple carrier signaling was introduced on the medium (10-20 kV) and low voltage (240/415V) distribution systems. For many years the search has been going on for a cost effective bi-directional technology suitable for applications such as remote meter reading. For example, the Tokyo Electric Power Co was running experiments in the 1970's which reported successful bi-directional operation with several hundred units. Since the mid-eighties there has been a surge of interest in using the potential of digital communications techniques and digital signal processing.

Broadband over power lines (BPL), also known as power-line Internet or Powerband, is the use of power line communication technology to carry radio signals for communication purposes, and in particular, to provide broadband Internet access through ordinary power lines. An aim of BPL is that a computer, or any other communication device, would need only to plug a BPL modem into any outlet in an equipped building to have high-speed Internet access.

BPL has an advantage in that the extensive infrastructure already available would appear to allow people in remote locations to have access to data networks, such as the Internet, with relatively little equipment investment by the utility. Also, such ubiquitous availability would make it much easier for other electronics, such as televisions or sound systems, to hook up to such a network.

Modern BPL systems typically use OFDM modulation which is effective in the high noise environment of the power line and also allows the mitigation of interference with radio services by removing specific frequencies used. The present teachings are however general to any kind of modulation found to be suitable.

The electrical distribution system is multi-phase. In some countries it is usual for a single domestic premises to receive just a single phase, and in other countries it is usual for them to receive two or three phases. Even in cases where the premises receive three phases, most power outlets carry only a single phase plus the neutral line. Typically the premises would be wired so that different areas thereof receive different phases. Any given computer or electric device in such a premise would therefore be connected to one of the three phases, and the signal for that device would be sent through that phase. This raises the problem that, for example, a computer located in a particular part of a building where it is connected to a given phase, could not be moved to another part of the building unless the phase used in that part of the building is also identified and configured for communication.

SUMMARY OF THE INVENTION

The present invention in embodiments thereof teaches the sending of a communication signal through multiple high voltage lines, more particularly but not exclusively through multiple phases.

According to an aspect of some embodiments of the present invention there is provided a method for transferring communication data over power lines, the power lines comprising multiple phase transmission lines and a neutral line, the method comprising inserting the communication data between multiple lines; transmitting the received communication data to one or more lines in an end premises, and reading the communication data from any one of said lines. The lines are typically but not necessarily different phases.

In an embodiment, a combiner-splitter may be used to recombine communication data from multiple lines, by extracting signals from said lines to form a combined signal and transmitting said combined signal over a plurality of in-premise lines for in-premise reception, thereby to allow reception of said combined signal at any one of said in-premise lines.

In an embodiment, said inserting the communication data comprises feeding said data between the neutral line and at least two of said phase lines.

In an embodiment, said inserting the communication data comprises feeding said data between the neutral line and three of said phase lines.

In an embodiment, said data inserting is via a capacitive element.

In an embodiment, said data inserting is via an inductive element.

In an embodiment, said inserting the communication data comprises line matching to each of said lines.

The method may comprise transmitting a return signal from said premises by splitting said return signal between said plurality of lines.

The method may comprise combining signals from each of said in-premise lines to form a combined return signal.

According to a second aspect of the present invention there is provided apparatus for improved signal reception from power lines comprising:
a multi-line splitter configured for splitting a signal for transmission over a plurality of transmission lines, and
a combiner configured for combining the signal from the plurality of lines into a single signal for reception.

In an embodiment, said combiner is configured to send said single signal for reception down multiple in-premise lines of receiving premises.

In an embodiment, said multi-line splitter is configured with communication electronics to provide matched impedance for each line.

In an embodiment, said plurality of transmission lines comprise separate phases and a neutral line.

An embodiment may comprise an in-premises splitter for splitting a return signal from said premises over said multiple lines.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1A:
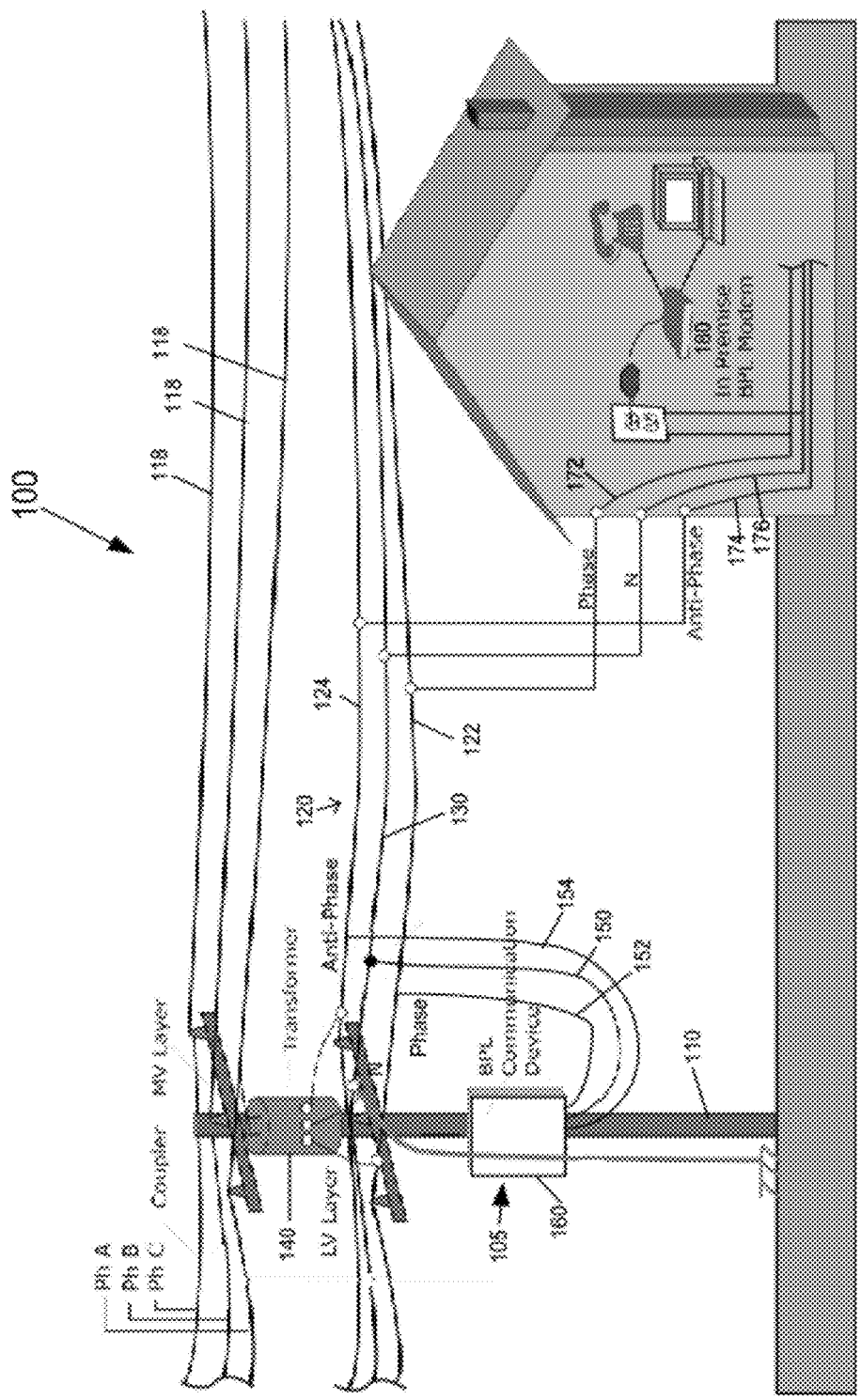
FIGS. 1A and 1B are simplified schematic block diagrams of a power line communications system using multiple line transmissions, according to first and second embodiments of the present invention.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DESCRIPTION OF EMBODIMENTS OF THE INVENTION

The present invention, in some embodiments thereof, relates to apparatus and a method for data transmission over power lines and, more particularly, but not exclusively, to such data transmission wherein the power lines are multi-phase.

Current systems typically transmit data on a single phase as the data is typically received by an end user at a single phase electric plug. On the hardware front any additional phase used would need to be equipped with repeaters etc and would further need to be connected to the signal in the first place. Furthermore there is the need for impedance matching, in order to avoid transmission losses and reflected transmissions, and in general to optimize the system.

The present embodiments by contrast sends data through all the phases and ensures that each power outlet receives data from all the phases. Thus, since substantially all the data may be transmitted between the neutral and multiple phases, substantially all the data transmitted may be received by a target destination, whether the target destination is serviced by phase 1, phase 2 or phase 3 etc., or any combination of phases.

The result is not only greater availability of the signal but also greater intensity of the signal, or reliability of the signal as will be explained in greater detail below, including greater robustness to noise. As a result, although more phases are involved, there may be less need overall for repeaters and like equipment. Furthermore, use of multiple phases ensures that the signal is robust, in the sense that it is not substantially disturbed, corrupted, delayed or limited by a monitor, such as for example an electric meter, that measures between the multiple phases.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates data transmission over multiple phases in a multiple phase electric system. In embodiments such multi-phase transmission may enable increased data transmission quality and/or reliability.

Reference is now made to FIG. 1 which is a schematic block diagram illustration of an electricity system 100 including communications apparatus 105 to enable transmission or communication of data over multiple phases or lines in a multi-phase power line communications system, relative to the neutral line. As can be seen in FIG. 1, the apparatus may include a power line pole or electricity tower or base 110, which may support a variety of power or transmission lines, for example, low voltage lines 120. Low voltage lines may include 1, 2 or 3 phase lines 122, and 124 (the third phase not being featured in the figure for simplicity), as well as neutral line 130. Electricity system 100 may include a transformer drum 140, which may be connected to one or more medium voltage lines 118.

Apparatus 105, which may enable transmission or communication of data using multiple lines, may include a communications modem 160. Communications modem 160 may include, for example, line impedance matching functionality for each of the lines used. Communications modem 160 may have three or more exiting lines, for example, line 150 connecting communications modem 160 to neutral line 130, line 152 connecting communications modem 160 to phase line 122, and line 154 connecting communications modem 160 to snit-phase (anti-phase) line 124. Of course, other structures, materials and dimensions may be used.

Figure 1B:
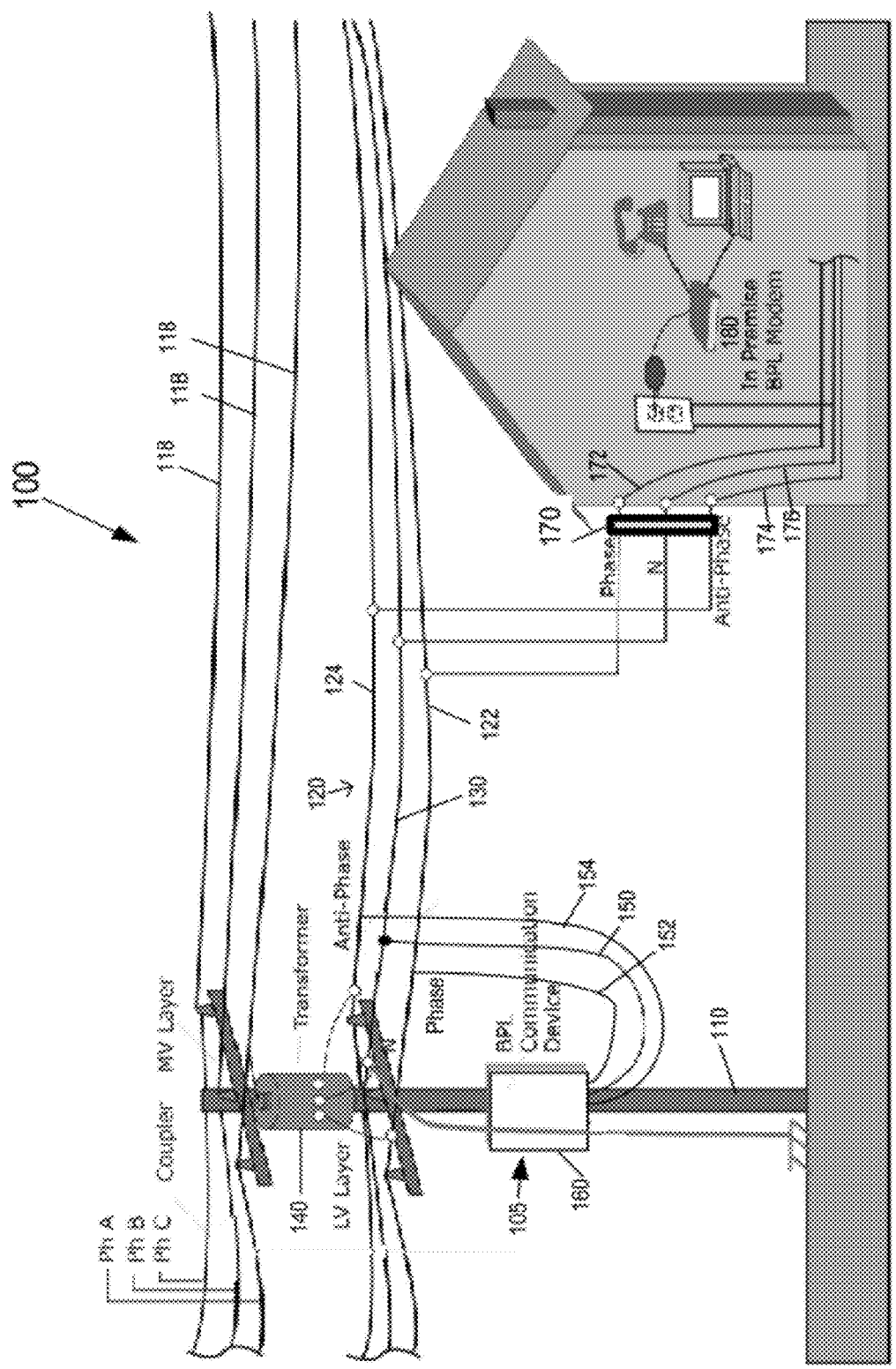

System 100 may include a receiving premises communications apparatus, for example, communications box 170 as shown in FIG. 1B, which may be a communications box to manage a signal that is broadcast over multiple lines to a house or building. Communications box 170 may have three or more exiting lines, for example, line 172 connecting communications box 170 to phase line 122, line 174 connecting communications box 170 to phase line 124, and line 176 connecting communications box 170 to neutral line 130. Of course, other structures may be used.

Communications box 170 may include a combiner for combining the signal from all the phases to form a combined signal and then transmits the combined signal along all in premise lines, so that within the premises it is possible firstly to obtain the signal at any location and secondly that the signal obtained has all the strengths of being the combination of the signal from each line. Thus if one line has a weaker signal the final result is less affected than it would otherwise be. As a result, the need for repeaters and the like is reduced. Communications box 170 may include a splitter, for example a multi-line splitter, for splitting the signal from all the phases to transmit the split signal to multiple phase lines. Hereinafter the combiner and splitter are referred to as combiner-splitter, which may perform combining and/or splitting functions. For example, the combiner-splitter may combine radio frequency inputs from two or more phases into a single output, or, when used in the opposite direction, divide a single RF input into two or more outputs.

Apparatus 105, according to some embodiments, may transmit data using, for example, high frequency signals, along multiple lines. For example, data may be broadcast along lines 150, 152 and 154. In this way substantially all data may be substantially transmitted along multiple lines relative to the neutral line, such that, combined with use of a combiner-splitter in unit 170, a receiving unit, for example, modem 180 may receive a substantial signal from one or more lines, for example, lines 172 and 174. In this way system 100 may enable high quality communications to multiple plugs in a target location, since the data communicated is combined from all transmission line phases and transmitted to all relevant plugs and on multiple in-premise phases. Furthermore, if the combiner-splitter in unit 170 is used, then the received signal is the signal combined from all the lines and therefore does not suffer from the weaknesses of any one particular line, as explained.

According to an alternative embodiment, data may be transmitted between neutral and multiple phases, thereby ensuring that the data is not substantially disturbed, corrupted, delayed or limited by monitoring devices such as an electric meter that might be active on one or more of the phases, say to measure between the multiple phases. Further, since substantially all the data may be transmitted between the neutral and multiple phases, substantially all the data transmitted may be received by a target destination, whether the target destination is serviced by phase 1, phase 2 or phase 3 etc.

Reference is now made to FIG. 1B, which shows how communications unit 170 may be combined with the system of FIG. 1A. As explained above, box 170 receives data signals from multiple low voltage lines, for example, lines 172, 174, 176. Communications unit 170 may then combine, and broadcast or otherwise transmit substantially all data as a combined signal but split along the various multiple lines of the premises for reception, for example, lines 172, 174 and 176. Use of the combined signal may, for example, increase the signal intensity of the data signals transmitted by communications device 105, therefore allowing for clearer reception. As explained, such an option negates the effects of problems such as noise on individual lines.

Communications unit 170 may further comprise a splitter for splitting a return signal so that the return signal is split for transmission between the different lines or phases. The splitter may be preceded by a combiner so as to pick up signals from any of the lines at the premises. It is noted that communications unit 170 may be coupled to modem 180 or may be independent thereof. In practice a single splitter/combiner may be provided to work in both directions, and may or may not be coupled to a communications modem.

Figure 2A:
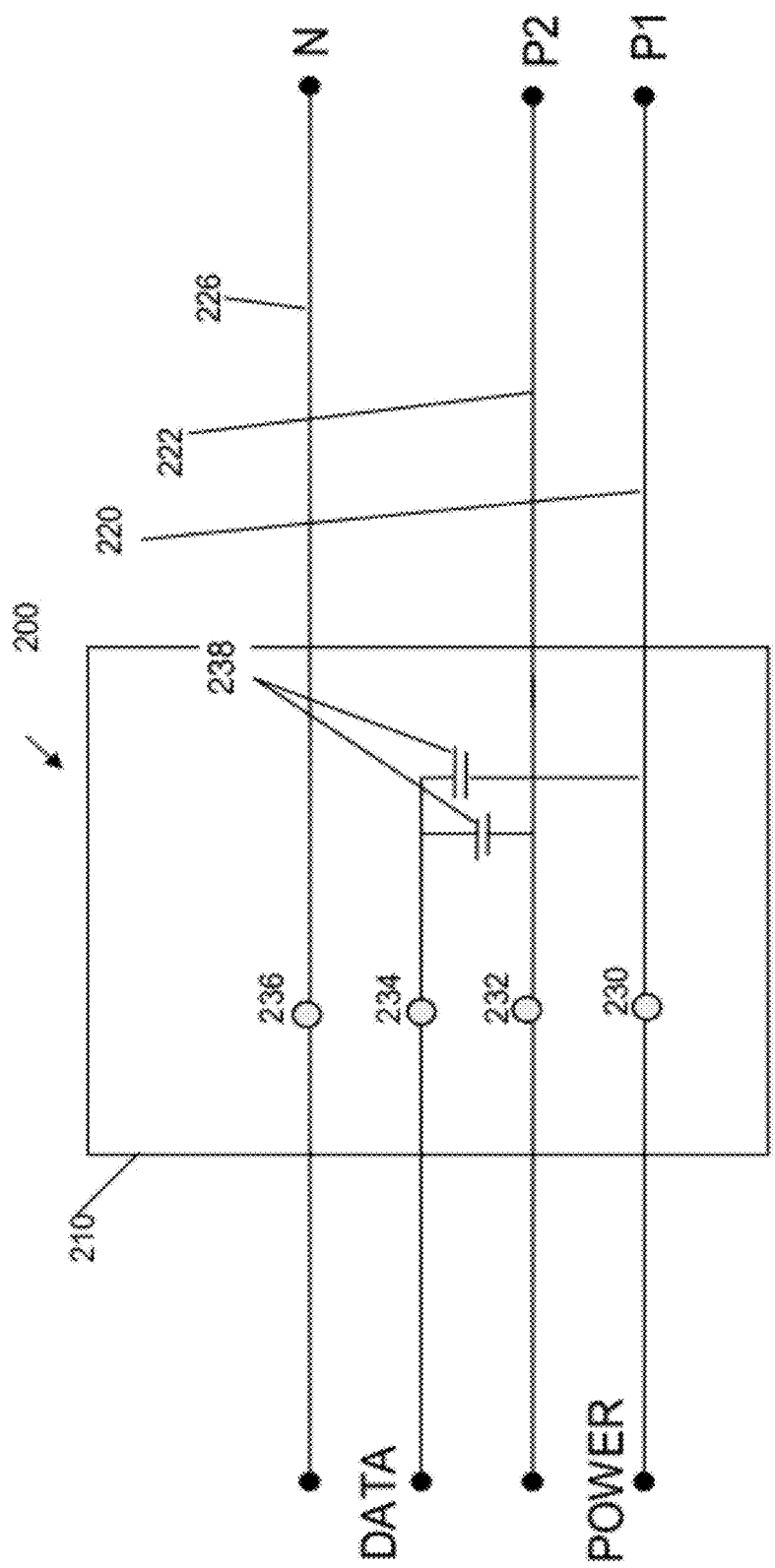
FIG. 2A is a simplified schematic block diagram of a power line communications apparatus using multiple line transmissions, according to some embodiments of the present invention.

Reference is now made to FIG. 2A, which shows a communications apparatus 200 configured to transmit data along multiple lines. A splitter of this kind may be included in communications apparatus 170 or apparatus 105 or at other locations in the system as required. As can be seen in FIG. 2A, a multi-phase plug 210 may be used, and substantially all data may be streamed to all the phases or lines relative to the neutral line, including lines 220, 222, and 226, at pins 230, 232, 234 and 236. In some embodiments one or more inductors 238 may be used, to generate inductive transmission of signals, for example to filter out low frequency signals along selected wires. In the embodiment illustrated one or more capacitors may be used to filter out low frequency signals and allow high frequency signals to be transmitted along multiple lines. Other plugs may be used, for example, plugs with two, three, four or more pins.

Figure 2B:
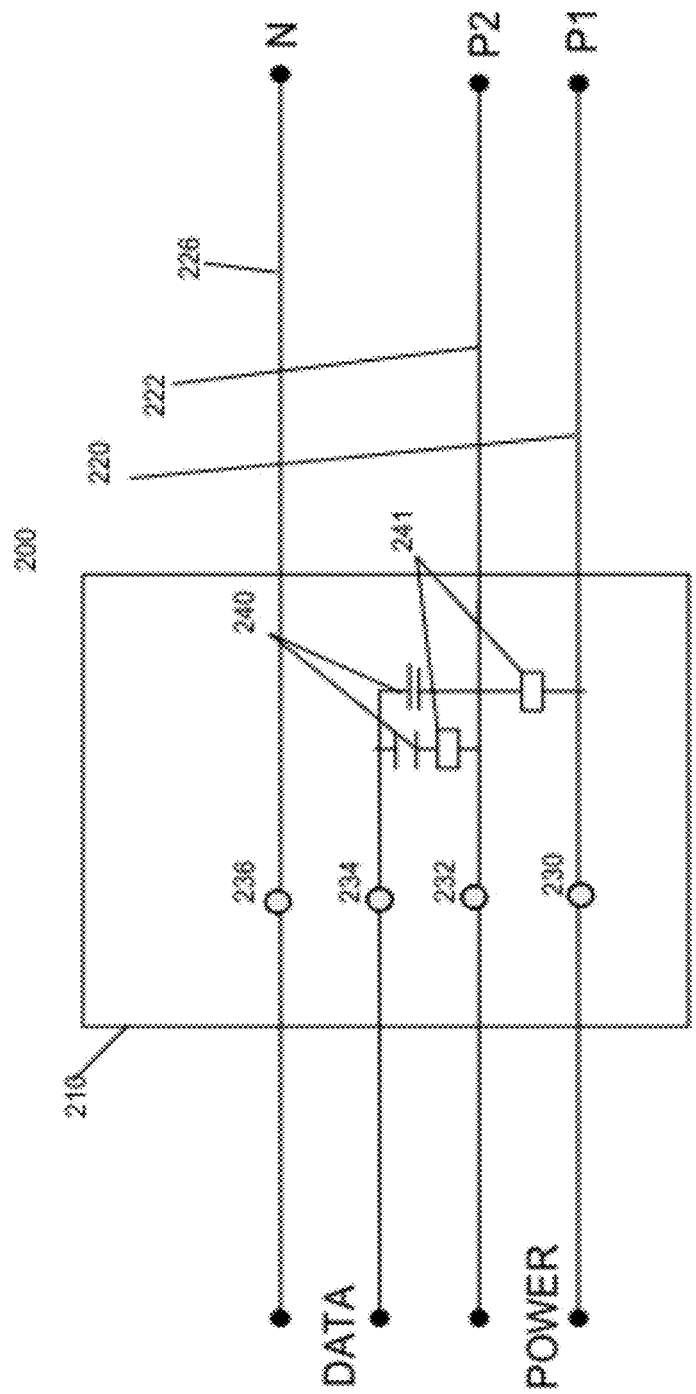
FIG. 2B is a simplified schematic block diagram of a power line communications apparatus using multiple line transmissions, according to additional embodiments of the present invention.

Reference is now made to FIG. 2B, which shows a communications apparatus 200 configured to transmit data along multiple lines. The communications apparatus comprises a splitter, and a splitter of this kind may be included in communications apparatus 170 or apparatus 105 or at other locations in the system as required. As can be seen in FIG. 2B, one or more capacitors 240 and one or more resistors 241 may be used to handle impedance matching if using multiple phases, so that transmissions may be optimized and to avoid transmission losses and returning transmissions.

Figure 3:
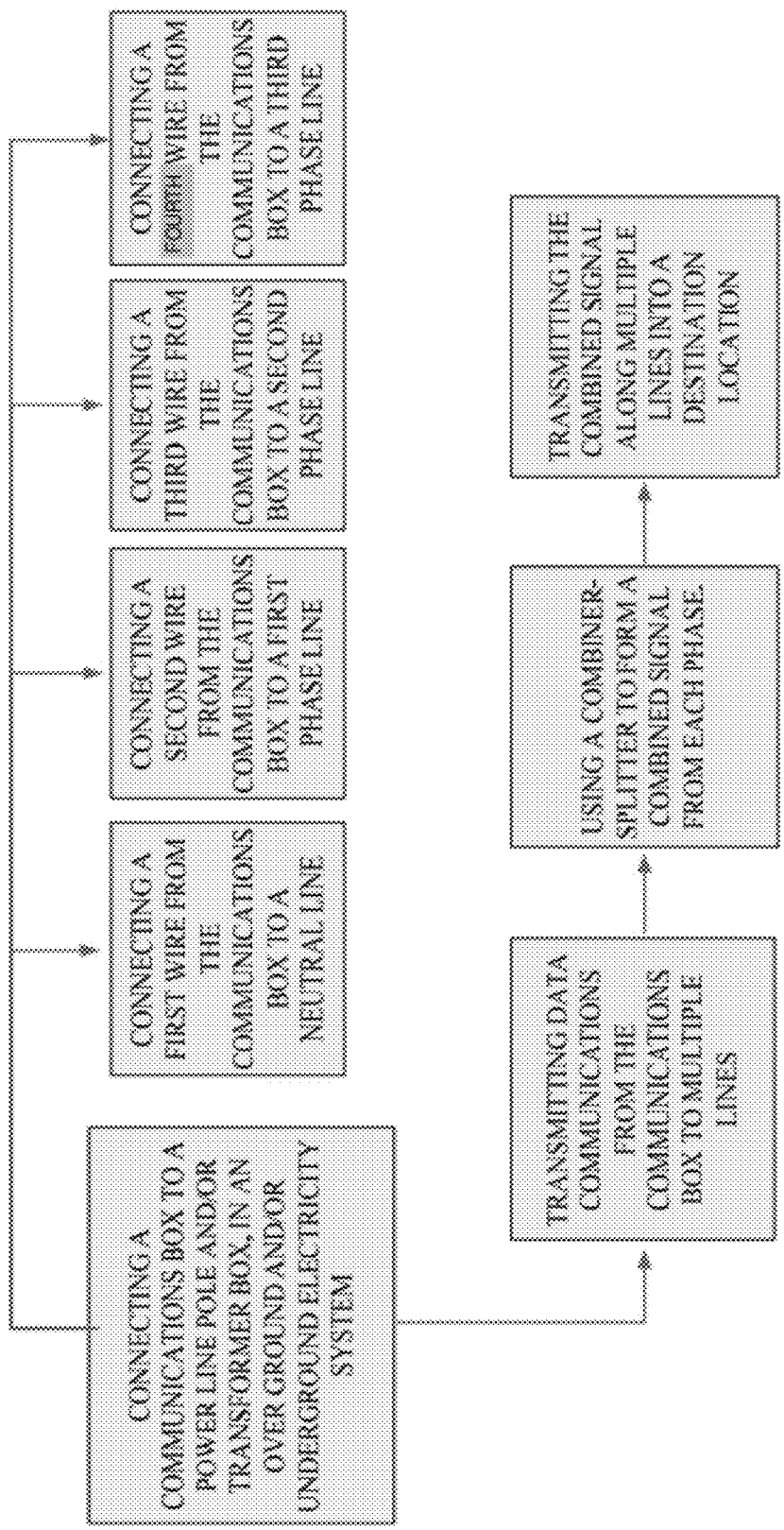
FIG. 3 is a simplified flow chart describing a method of implementing multi-phase transmissions in a power line communications system, according to some embodiments of the present invention.

Reference is now made to FIG. 3, which is a simplified diagram illustrating a general methodology for implementing a preferred embodiment of the present invention. The illustrated series of operations or processes, in varying combinations, may be implemented to enable data communications using multiple lines. A communications box may be connected to a power line pole and/or transformer box, in an overhead and/or underground electricity system. A first wire from the communications box may be connected to a neutral line. A second wire from the communications box may be connected to a first phase or line. A third wire from the communications box may be connected to a second phase or line, where a two or more phase electric system is present. A fourth wire from the communications box may be connected to a third phase or line, where a three phase electric system is present. Data communications may be transmitted from the communications box to the above-connected phase lines relative to the neutral line, so that the communication signal is transmitted via each phase. For example, transmissions may be transmitted differentially to the neutral line and the phase lines, so that substantially all the communications data is transmitted to phase 1, phase 2, and/or phase 3, or any combination thereof. In some embodiments a second communications box may be set up adjacent to a destination location (e.g., home, building, office unit etc.), to form a combined signal from each phase and then enable transmission of the combined signal along multiple lines into the destination location, so that the combined signal may be received at any power outlet at the destination irrespective of its phase or location in the building. Any combination of the above steps may be implemented. Further, other steps or series of steps may be used. As explained above, signals received from multiple phases of a destination or source location may be combined, for example, by a combiner-splitter, into a combined signal, and then transmitted to one or more phases. In some embodiments the combined signal may be divided between multiple phases and transmitted in such a fashion.

It is expected that during the life of a patent maturing from this application many relevant power distribution systems, and data distribution systems over power lines, will be developed and the scope of the terms used herein is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of transferring communication data over power lines, the power lines comprising low voltage (LV) multiple phase transmission lines and a neutral line, the method comprising:
   inserting the communication data between multiple ones of said LV lines;
   combining the communication data from at least two of said LV lines, to form a combined signal; and
   transmitting said combined signal over a plurality of in-premise LV lines.

2. The method of claim 1, wherein said combining comprises extracting signals from said multiple lines using a combiner-splitter coupled to a communications modem.

3. The method of claim 1, wherein said inserting the communication data comprises feeding said data between the neutral line and at least two of said phase lines.

4. The method of claim 1, wherein said inserting the communication data comprises feeding said data between the neutral line and three of said phase lines.

5. The method of claim 3, wherein said data inserting is via a capacitive element.

6. The method of claim 3, wherein said data inserting is via an inductive element.

7. The method of claim 1, wherein said inserting the communication data comprises line matching to each of said lines.

8. The method of claim 1, further comprising transmitting a return signal from said premises by splitting said return signal between said plurality of lines.

9. The method of claim 1, further comprising combining signals from each of said in-premise lines to form a combined return signal.

10. The method of claim 9, further comprising transmitting said combined return signal to multiple phase voltage lines.

11. Apparatus for improved signal reception from low voltage (LV) power lines comprising:
    a multi-line splitter configured for splitting a signal for transmission over a plurality of LV transmission lines; and
    a combiner configured for combining a signal from a plurality of LV lines into a single signal for reception.

12. Apparatus according to claim 11, wherein said combiner is configured to send said single signal for reception down multiple in-premise lines of receiving premises.

13. Apparatus according to claim 11, wherein said multi-line splitter is configured with communication electronics to provide matched impedance for each line.

14. Apparatus according to claim 13, wherein said plurality of transmission lines comprise separate phases and a neutral line.

15. Apparatus according to claim 11, further comprising an in-premises splitter for splitting a return signal from said premises over said multiple lines.

16. Apparatus according to claim 11, wherein said combiner is configured to combine radio frequency inputs from two or more phases into a single output.

17. Apparatus according to claim 11, wherein said splitter is configured to divide a single RF input into two or more outputs.

* * * * *